United States Patent [19]

Ujiie et al.

[11] Patent Number: 5,686,968
[45] Date of Patent: Nov. 11, 1997

[54] SYNCHRONIZING SIGNAL GENERATION CIRCUIT

[75] Inventors: Mikio Ujiie, Tokyo; Hisato Kokubo, Osaka, both of Japan

[73] Assignee: NEC Corporation, Tokyo, Japan

[21] Appl. No.: 637,605

[22] Filed: Apr. 25, 1996

[30] Foreign Application Priority Data

Apr. 28, 1995 [JP] Japan .................................. 7-106755

[51] Int. Cl.$^6$ .................................................. H04N 5/06
[52] U.S. Cl. ........................ 348/521; 348/524; 348/545
[58] Field of Search ................................ 348/521, 522,
348/523, 524, 536, 537, 540, 541, 542,
543, 544, 545, 546, 500, 501, 510, 512;
358/150, 151, 158; H04N 5/06

[56] References Cited

U.S. PATENT DOCUMENTS

| | | | |
|---|---|---|---|
| 3,991,270 | 11/1976 | Van Straaten et al. | 348/545 |
| 4,253,116 | 2/1981 | Rodgers, III | 348/545 |
| 4,467,359 | 8/1984 | Hosoya | 348/541 |
| 4,812,783 | 3/1989 | Honjo et al. | 348/546 |
| 5,019,907 | 5/1991 | Murakoshi et al. | 358/158 |
| 5,121,206 | 6/1992 | Shibayama et al. | 358/150 |
| 5,319,706 | 6/1994 | Mizukata et al. | 380/5 |
| 5,502,502 | 3/1996 | Gaskill et al. | 348/546 |

FOREIGN PATENT DOCUMENTS

| | | | |
|---|---|---|---|
| 62-31270 | 2/1987 | Japan | H04N 5/06 |
| 7-1423 | 1/1995 | Japan | |

Primary Examiner—John K. Peng
Assistant Examiner—Chris Grant
Attorney, Agent, or Firm—Sughrue,Mion,Zinn,Macpeak & Seas, PLLC

[57] ABSTRACT

The present invention relates to a synchronizing signal generation circuit equipped with a PLL circuit. A pulse signal having a time constant that is broader than the clock width of a horizontal synchronizing signal included within synchronizing signals and that moreover contains steady-state phase error of the PLL circuit is generated and inputted to a phase comparison inhibiting circuit by way of a signal conversion circuit. The logic level of the pulse signal is then varied for the active interval and the inactive interval of the vertical synchronizing signal, phase comparison of the horizontal synchronizing signal and the reproduced horizontal synchronizing signal being inhibited during the active interval. The reproduced horizontal synchronizing signal is generated based on the output of two frequency dividers.

8 Claims, 5 Drawing Sheets

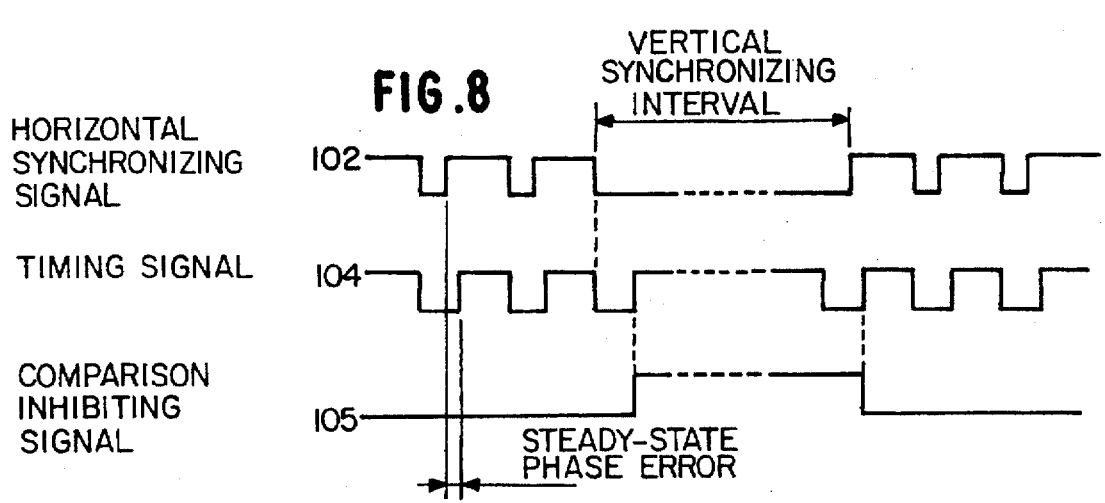
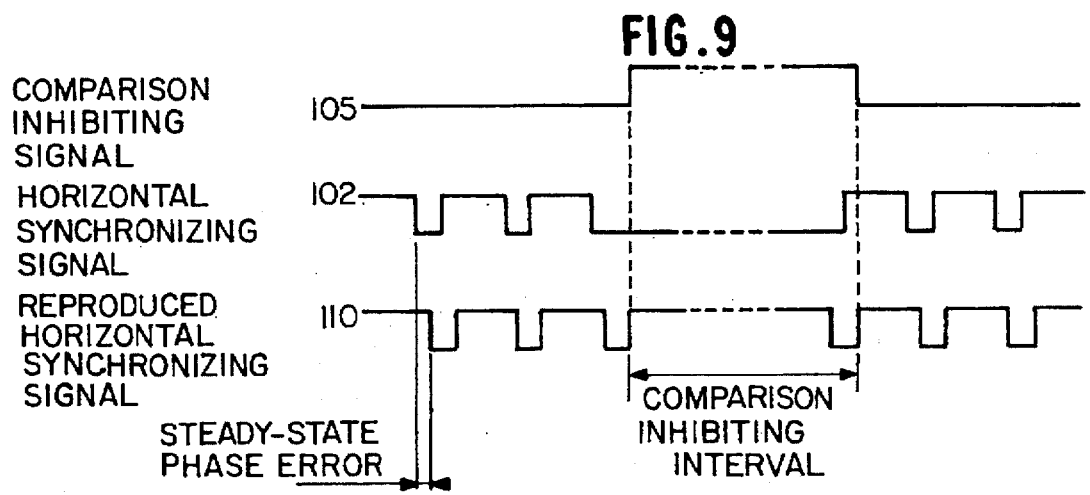
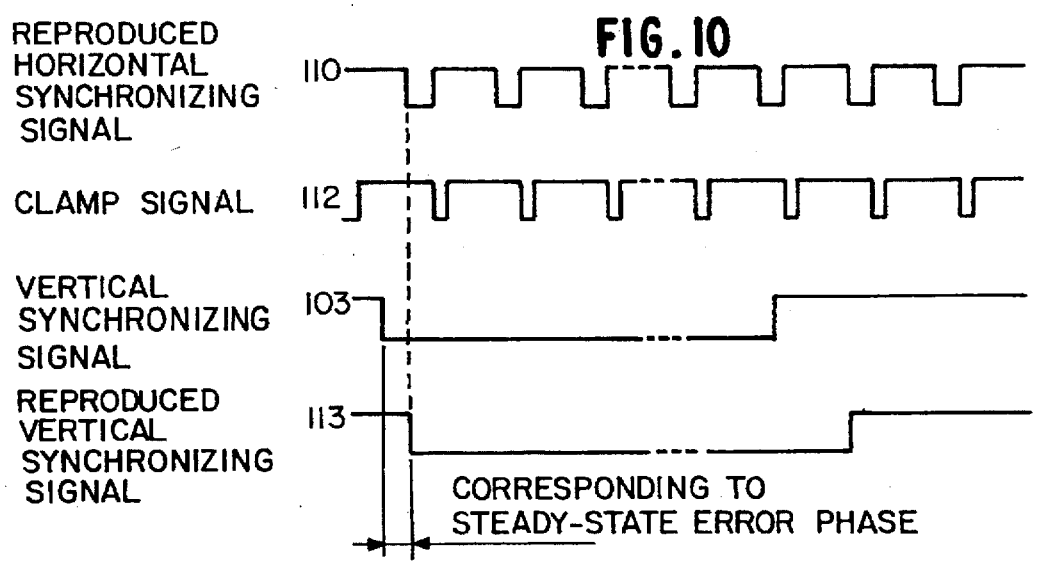

SYNCHRONIZING SIGNAL GENERATION CIRCUIT

BACKGROUND OF THE INVENTION

1. Field of the Invention

The present invention relates to image processing technology employing television image processing according to the NTSC (National Television System Committee) system or PAL (phase alternation by line) system, computer graphics (CG), CAD (computer-aided design) system, or a liquid crystal display; and particularly relates to a synchronizing signal generation circuit that generates a dot clock signal and a horizontal synchronizing signal synchronized with a composite synchronizing signal produced from a horizontal synchronizing signal and a vertical synchronizing signal.

2. Description of the Related Art

In a liquid crystal display, a dot clock corresponding to each pixel is required, and video signals (R, G, B signals) converted to digital values or analog values must be sampled by these dot clock signals.

In some cases, however, as described in Japanese Patent Publication No. 1423/95, a horizontal synchronizing signal is not present in the vertical synchronizing interval of video signals, i.e., the interval in which a vertical synchronizing signal is active. Moreover, even if the horizontal synchronizing signal is present, this signal may not be in phase with the horizontal synchronizing signal outside the vertical synchronizing interval. In such cases, prior-art methods have involved either specially generating a horizontal synchronizing signal, vertical synchronizing signal, and a dot clock signal that are mutually synchronized, or preventing shifts in synchronization of video signals by inhibiting phase comparison in the interval, as in the "pulse generation circuit" described in Japanese Patent Publication No. 1423/95. The technology used in these signal processes is based on PLL (phase-locked loop) technology, and when the synchronizing signals are intermittent signals, a sample-hold circuit must be provided within the PLL circuit to stabilize operation of the PLL circuit and processing to hold the DC bias of the VCO (voltage-controlled oscillator) during an intermittent interval must be performed.

On the other hand, there is a growing demand to display images of, for example, normal or high resolution on one liquid crystal display instead of on respective CRT displays, and the frequency of synchronizing signals or the number of pixels within a horizontal synchronizing interval differ according to the functions of the provided image processors or by maker. Conventionally, to allow processing by one synchronizing signal generation circuit for such a plurality of functional specifications (accommodation of a plurality of functional specifications is known as "multisync"), a plurality of VCOs is provided within a PLL circuit and one of the VCOs is selected according to its functional specifications.

However, the intervals of phase comparison in the above-described "pulse generation circuit" can be predicted in the design stage of a PLL circuit, and stationary phase error of a PLL circuit that actually occurs in phase comparison is not taken into consideration. Moreover, the cycle (frequency) of the generated dot clock signal is fixed and cannot be subsequently changed. The problem therefore arises that a dot clock signal synchronized to the video signals cannot always be reliably generated.

There is also the problem that overall circuit construction cannot be simplified because a plurality of VCOs must be provided in the construction of a PLL circuit capable of handling multisync as described above.

SUMMARY OF THE INVENTION

The object of the present invention is to provide a synchronizing signal generation circuit that generates a horizontal synchronizing signal, a vertical synchronizing signal, and a high-speed dot clock signal that are always stable even in cases in which the horizontal synchronizing signal is not present in a vertical synchronizing interval, or in which the horizontal synchronizing signal present in a vertical synchronizing interval is not in phase with the horizontal synchronizing signal outside the vertical synchronizing interval.

Another object of the present invention is to provide a synchronizing signal generation circuit with a simple construction that is capable of multisync.

According to the present invention, a synchronizing signal generation circuit is provided that includes:

- circuit means that separates and extracts a horizontal synchronizing signal and a vertical synchronizing signal from a signal in which the horizontal synchronizing signal and the vertical synchronizing signal are combined;
- PLL circuit means provided with a phase comparison circuit that inputs the horizontal synchronizing signal, a voltage-controlled oscillator that outputs signals of oscillation frequency that accords with the output of the phase comparison circuit, and a frequency divider that frequency divides the output of the voltage-controlled oscillator and generates clock signals, in which the output of the frequency divider is directed to the phase comparison circuit as signals to be compared;
- pulse signal generation circuit means that generates pulse signals that are synchronized with the horizontal synchronizing signal and moreover, that are of a time constant containing the steady-state phase error of the PLL circuit that occurs in phase comparison;
- signal conversion circuit means responsive to the pulse signals for sampling the horizontal sync signal to generate a signal indicative of the active interval and inactive interval of the vertical synchronizing signal;
- phase comparison inhibiting circuit means that directs output of the signal conversion circuit means to the phase comparison circuit means and inhibits phase comparison during the active interval of the vertical synchronizing signal.

In the present invention, a pulse signal that is synchronized with a horizontal synchronizing signal and moreover, that is of a time constant containing the steady-state phase error of the PLL circuit that occurs in phase comparison is made a trigger signal for inhibiting phase comparison of the PLL circuit; the logic level of the pulse signal produced by the signal conversion circuit means is varied between an interval when the vertical synchronizing signal is active and an interval when the vertical synchronizing signal is inactive; and phase comparison is inhibited by using the logic level of the pulse signal during an active interval of the vertical synchronizing signal, and phase comparison is allowed during times of other logic level. In this way, the steady-state phase error portion is absorbed and phase comparison is performed or inhibited, thereby enabling a clock signal of stable phase to be obtained.

The present invention additionally provides a synchronizing signal generation circuit that includes:

- circuit means that separates and extracts a horizontal synchronizing signal and a vertical synchronizing signal from a signal in which the horizontal synchronizing signal and the vertical synchronizing signal are combined;

PLL circuit means provided with a phase comparison circuit that inputs the horizontal synchronizing signal, a voltage-controlled oscillator that outputs signals of oscillation frequency that accords with output of the phase comparison circuit, a first frequency divider that frequency divides output of the voltage-controlled oscillator and generates clock signals, a second frequency divider that frequency divides the output of the first frequency divider, and a horizontal synchronizing signal reproduction circuit that generates a reproduced horizontal synchronizing signal from the output of the second frequency divider; and in which the reproduced horizontal synchronizing signal is directed to the phase comparison circuit as a signal to be compared;

pulse signal generation circuit means that generates pulse signals that are synchronized with the horizontal synchronizing signal and moreover, that are of a time constant containing the steady-state phase error of said PLL circuit that occurs in phase comparison;

signal conversion circuit means responsive to said pulse signals for sampling the horizontal sync signal to generate a signal indicative of active interval and an inactive interval of the vertical synchronizing signal;

phase comparison inhibiting circuit means that directs output of said signal conversion circuit means to said phase comparison circuit means and inhibits phase comparison during the active interval of the vertical synchronizing signal;

vertical synchronizing signal reproduction circuit means that generates a reproduced vertical synchronizing signal from the vertical synchronizing signal and the reproduced horizontal synchronizing signal; and retiming circuit means that retimes the reproduced vertical synchronizing signal by output of the second frequency divider.

In the present invention, the first frequency divider and the second frequency divider are provided, and a dot clock signal is generated from the output of the first frequency divider and the horizontal synchronizing signal is generated from the second frequency divider. Therefore, the number of the combination of the frequency of the dot clock and the frequency of the horizontal synchronizing signal increases. The reproduced horizontal synchronizing signal become the signal subjected to phase comparison and is inputted to the phase comparison circuit, and phase comparison between the horizontal synchronizing signal and the reproduced horizontal synchronizing signal is either executed or inhibited. On the other hand, the vertical synchronizing signal, the horizontal synchronizing signal and the clamp signal are retimed by the output of the second frequency divider, whereby synchronizing signals that are distinct from the synchronizing signal obtained from video signals can be obtained, i.e., a dot clock signal, a reproduced vertical synchronizing signal, a reproduced horizontal synchronizing signal and a clamp signal can be obtained that are all in phase and moreover, are stabilized through absorption of the steady-state phase error portion of the PLL circuit.

According to an embodiment of the present invention, the horizontal synchronizing signal reproduction circuit means includes a first counting circuit that determines the cycle of the reproduced horizontal synchronizing signal based on the output of the second frequency divider, a second counting circuit that determines pulse width of the horizontal synchronizing signal based on the output of the second frequency divider, and a set/reset flip-flop circuit that inputs the output of the first counting circuit to a set terminal and inputs the output of the second counting circuit to a reset terminal.

According to another embodiment of the present invention, the vertical synchronizing signal reproduction circuit means is a plurality of cascade-connected synchronous flip-flops (shift register) which make the reproduced horizontal synchronizing signal into a clock, tie vertical synchronizing signal is inputted to the first-stage synchronous flip-flop, and delay taps are extracted from the output of each stage of synchronous flip-flops to enable regulation in steps of the amount of delay of the vertical synchronizing signal.

In addition, according to this invention, a synchronizing signal generation circuit includes:

circuit means that separates and extracts a horizontal synchronizing signal and a vertical synchronizing signal from a signal in which the horizontal synchronizing signal and the vertical synchronizing signal are combined;

PLL circuit means provided with a phase comparison circuit that inputs the horizontal synchronizing signal, a voltage-controlled oscillator that outputs signals of oscillation frequency that accords with output of the phase comparison circuit, and a frequency divider that frequency divides output of the voltage-controlled oscillator and generates clock signals, and in which the output of the frequency divider is directed to said phase comparison circuit as signals to be compared;

pulse signal generation circuit means that generates pulse signals that are synchronized with the horizontal synchronizing signal and moreover, that are of a time constant containing the steady-state phase error of said PLL circuit that occurs in phase comparison;

signal conversion circuit means responsive to said pulse signals for sampling the horizontal sync signal to generate a signal indicative of an active interval and an inactive interval of the vertical synchronizing signal;

phase comparison inhibiting circuit means that directs output of said signal conversion circuit means to said phase comparison circuit means and inhibits phase comparison during the active interval of the vertical synchronizing signal;

delay circuit means in which basic delay elements, which are made up of at least two logic elements connected in series and a dummy logic element parallel connected between the first-stage logic element and the last stage logic element, are connected in n (a natural number) stages, and delay taps are extracted from the output of each stage;

and wherein the output of the frequency divider is inputted to the first stage of the basic delay elements and the amount of delay of this frequency-divided output can be regulated in steps.

When the output (clock signals) of the first frequency divider is inputted to the first stage of the delay circuit, these clock signals are delayed by the basic delay elements and sequentially inputted to the last-stage basic delay element. At this time, variation in the amount of delay can be suppressed by using devices having multi-input terminals as the logic elements constituting each basic delay element, selecting the multi-input terminal among these multi-input terminals having the minimum delay difference between input and output, and finally, regulating the load by parallel-connecting dummy logic elements between logic elements. The amount of delay of clock signals can then be accurately regulated in steps by selectively employing the output of the stages of basic delay elements.

According to an embodiment of the present invention, the synchronizing signal generation circuit further includes a parameter setting circuit that allows free setting of the frequency-division number of the first frequency divider and second frequency divider, the count values of the first counting circuit and the second counting circuit, the amount of delay of the vertical synchronizing signal, and the amount of delay of the output.

The parameter setting circuit enables free setting of the frequency division number of the first frequency divider and the second frequency divider and the amount of delay of clock signals, thereby enabling application to multisync with one VCO and low-pass filter, and further, allowing a simplified circuit construction. In addition, instead of a construction in which two frequency dividers are physically isolated as a first frequency divider and a second frequency divider, the functions of the above-described two frequency dividers may be realized through one frequency divider and the settings of a parameter setting circuit.

As is clear from the foregoing explanation, the present invention enables a stabilized horizontal synchronizing signal, a stabilized vertical synchronizing signal, and a high-speed dot clock signal wherein the steady-state phase error of the PLL circuit is absorbed even when a horizontal synchronizing signal is not present within a vertical synchronizing interval or when a horizontal synchronizing signal is present but not in phase with a horizontal synchronizing signal outside the vertical synchronizing interval.

Regarding the PLL circuit, the present invention can be applied to multisync using one VCO and a low-pass filter of the same frequency band, thereby enabling simplification of the circuit construction.

The above and other objects, features, and advantages of the present invention will become apparent from the following description with reference to the accompanying drawings which illustrate a preferred embodiment of the present invention.

BRIEF DESCRIPTION OF THE DRAWINGS

FIG. 8 illustrates the timing relation between signals in timing generation circuit 4 and the stationary phase error portion.

FIG. 9 is a timing chart showing the timing between signals in phase comparison inhibiting circuit 6.

FIG. 10 is a timing chart showing the timing between signals in vertical synchronizing signal reproduction circuit 14 and clamp signal generation circuit 13.

DETAILED DESCRIPTION OF THE PREFERRED EMBODIMENTS

Figure 1:
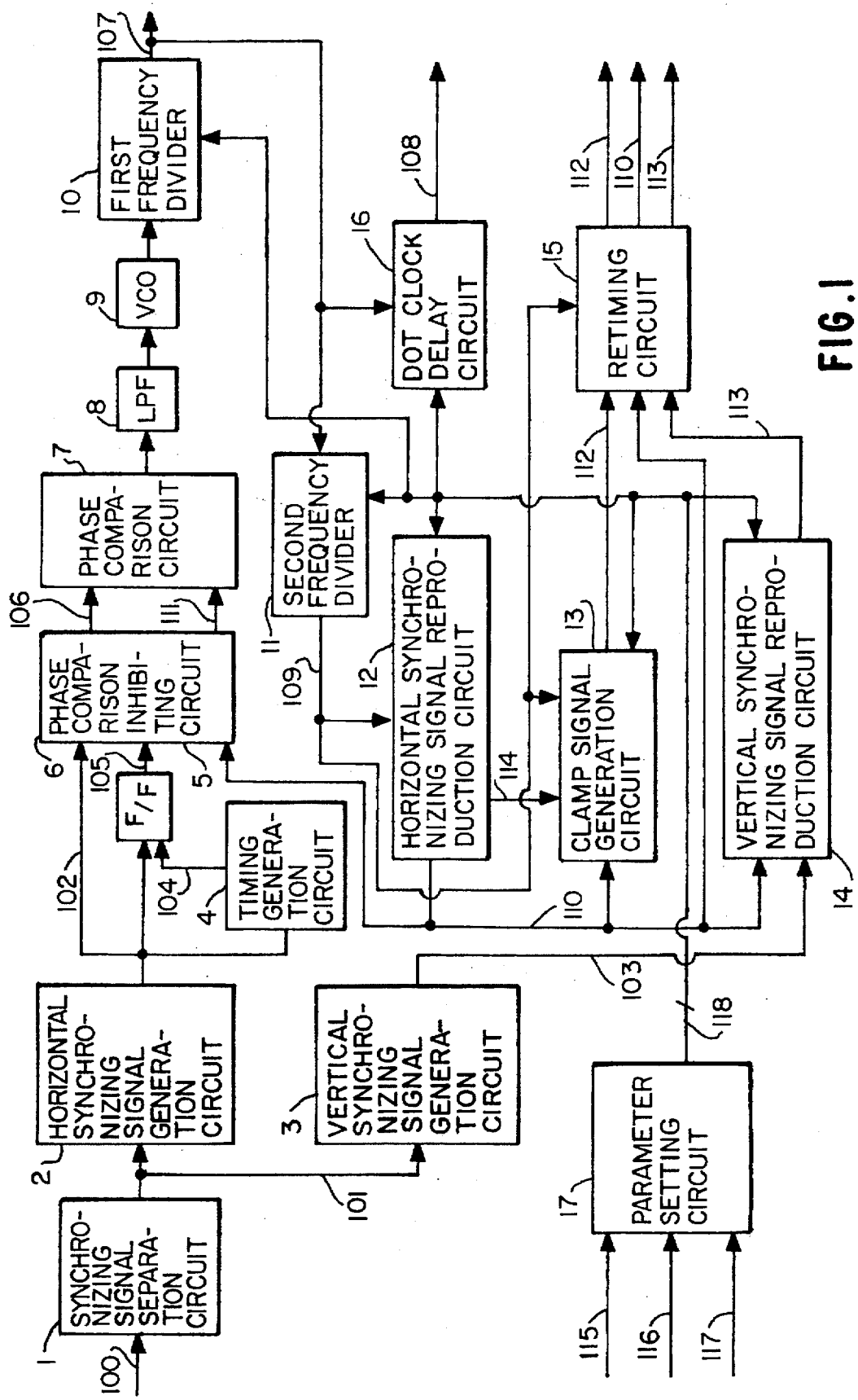
FIG. 1 is a block diagram showing the synchronizing signal generation circuit according to one embodiment of the present invention.

Referring to FIG. 1, a synchronizing signal generation circuit according to one embodiment of the present invention is constructed from synchronizing signal separation circuit 1, horizontal synchronizing signal generation circuit 2, vertical synchronizing signal generation circuit 3, timing generation circuit 4, flip-flop circuit (hereinafter abbreviated as "F/F") 5, phase comparison inhibiting circuit 6, phase comparison circuit 7, low-pass filter (LPF) 8, VCO 9, first frequency divider 10, second frequency divider 11, horizontal synchronizing signal reproduction circuit 12, clamp signal generation circuit 13, vertical synchronizing signal reproduction circuit 14, retiming circuit 15, dot clock delay circuit 16, and parameter setting circuit 17. Of these components, phase comparison inhibiting circuit 6, phase comparison circuit 7, low-pass filter 8, VCO 9, first frequency divider 10, second frequency divider 11, and horizontal synchronizing signal reproduction circuit 12 constitute a PLL circuit. Timing generator circuit 4 corresponds to the pulse generation circuit means. F/F 5 corresponds to the signal conversion circuit means. Instead of a construction shown in the figure in which comparison inhibiting circuit 6 and phase comparison circuit 7 are separate, a construction in which the two are unified is also possible.

Synchronizing signal separation circuit 1 inputs video signal 100 from an image processor (not shown) and separates synchronizing signal 101. Horizontal synchronizing signal generation circuit 2 and vertical synchronizing signal generation circuit 3 generate horizontal synchronizing signal 102 and vertical synchronizing signal 103, respectively, from synchronizing signal 101.

A pulse (composite signal) that represents a horizontal synchronizing interval (an interval during which the horizontal synchronizing signal is active) and a vertical synchronizing interval (an interval during which the vertical synchronizing signal is active) is superposed on horizontal synchronizing signal 102. Horizontal synchronizing signal 102 is divided into three components which are each inputted to phase comparison inhibiting circuit 6, the first output being inputted directly, the second output by way of synchronous F/F 5, and the third output by way of timing generation circuit 4 and F/F 5.

Figure 2:
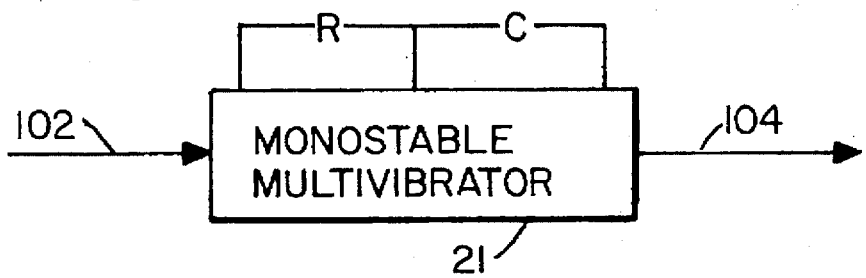
FIG. 2 is a circuit diagram of timing generation circuit 4.

As shown in FIG. 2, timing generation circuit 4 includes monostable multivibrator 21 which is triggered by the following edge (or rising edge) of horizontal synchronizing signal 102, and through coaction with the other logic circuits, generates timing signal 104 for determining the timing of a phase comparison inhibiting interval for phase or frequency. The time constant of monostable multivibrator 21 is broader than the pulse width of horizontal synchronizing signal 102, and moreover, is set to a value that contains the steady-state phase error portion which is unavoidable when using a PLL circuit, to be explained hereinbelow. The time constant of monostable multivibrator 21 is only the width of the steady-state phase error when monostable multivibrator 21 is triggered by the rising edge of the horizontal synchronizing signal.

F/F 5 retimes the vertical synchronizing interval of horizontal synchronizing signal 102 by the rising edge (or falling edge) of timing signal 104, and the thus-obtained comparison inhibiting signal 105 is outputted to comparison inhibiting circuit 6. The timing relation and steady-state phase error portion in this timing generation circuit 4 are shown in FIG. 8.

Figure 3:
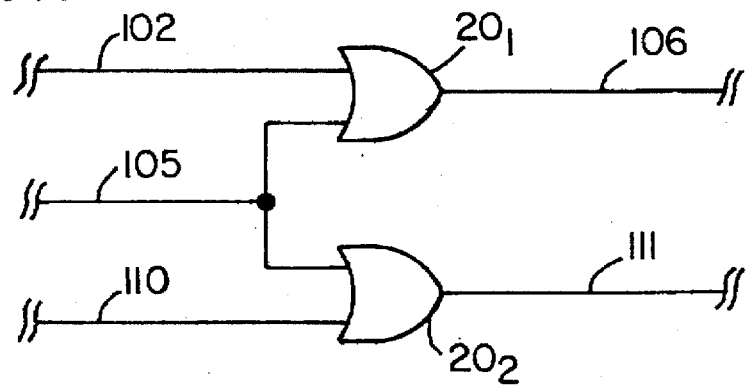
FIG. 3 is a circuit diagram of phase comparison inhibiting circuit 7.

Next, regarding the PLL circuit, phase comparison inhibiting circuit 6 can be constructed from, for example, OR circuits $20_1$ and $20_2$ as shown in FIG. 3. Comparison inhibiting signal 105 sent from F/F 5 determines the timing for inhibiting phase comparison of horizontal synchronizing signal 102 and reproduced horizontal synchronizing signal 110 (to be described hereinbelow). In other words, as shown in FIG. 9, the circuit operates such that phase comparison of horizontal synchronizing signal 102 and reproduced horizontal synchronizing signal 110 is inhibited only during the interval in which comparison inhibiting signal 105 is active. In this way, the PLL circuit can be operated stably even if horizontal synchronizing signal is not present within vertical the synchronizing interval of video signals 100, or if the horizontal synchronizing signal present within the vertical synchronizing interval is not in phase with horizontal synchronizing signal outside the vertical synchronizing interval. Phase comparison circuit 7 is provided at the output section of this comparison inhibiting circuit 6.

Furthermore, instead of the OR circuits shown in FIG. 3, phase comparison inhibiting circuit 6 may be constructed from AND circuits through the polarity (positive logic or negative logic) of each of input signals 102, 105, and 110 and phase comparison of phase comparison circuit 7 (to be explained).

Phase comparison circuit 7 compares the frequency and phase of horizontal synchronizing signal (102) 106 and reproduced horizontal synchronizing signal (110) 111 during intervals in which comparison inhibiting signal 105 is inactive, and in this embodiment, is constructed from an edge-detecting phase comparator. Phase comparison circuit 7 detects the frequency and phase of both signals 106 and 111 and outputs an error signal according to the difference to low-pass filter 8.

Low-pass filter 8 smooths the inputted error signal and outputs the above error as a DC bias to VCO 9. VCO 9 increases or decreases oscillation frequency in accordance with the DC bias. In addition, the range of frequency over which this VCO 9 oscillates is preferably set wide to allow application to multisync. In the present embodiment, the VCO is set to oscillate over a range of from 190 MHz to 280 MHz.

The output of VCO 9 is 1/M frequency divided (M is an integer equal to or greater than 2) at first frequency divider 10. This output becomes dot clock signal 107 and is supplied to a display (not shown). This dot clock signal 107 is further inputted to dot clock delay circuit 16 and second frequency divider 11. Dot clock delay circuit 16 outputs delay signal 108 of this dot clock signal 107, regarding which explanation will be provided hereinbelow. Second frequency divider 11 1/P frequency divides dot clock signal 107 (P is an integer equal to or greater than 2) and outputs signal 109 that has been 1/P frequency divided to horizontal synchronizing signal reproduction circuit 12, clamp signal generation circuit 13, and retiming circuit 15.

Figure 4:
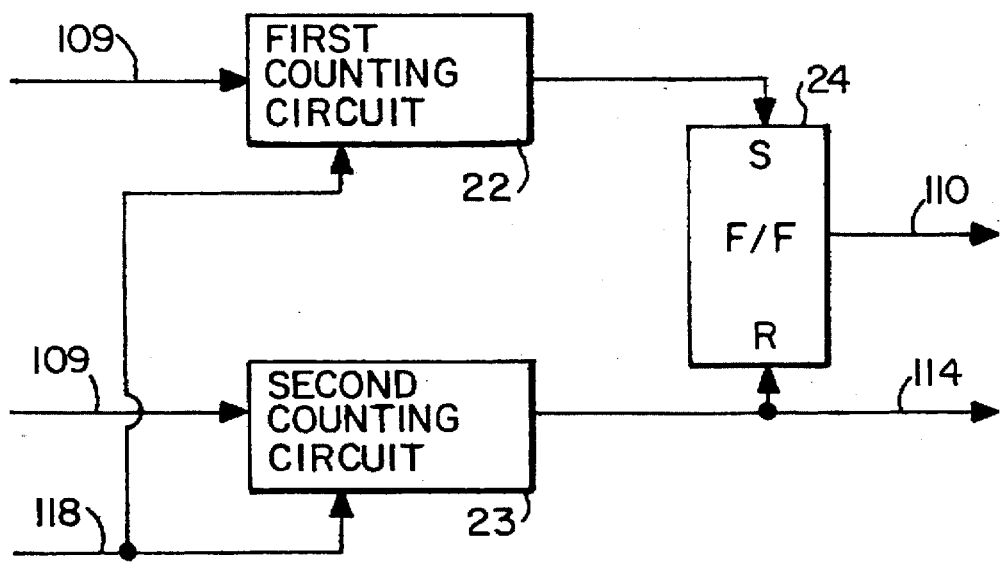
FIG. 4 is a circuit diagram of horizontal synchronizing signal reproduction circuit 12.

Horizontal synchronizing signal reproduction circuit 12 reproduces a horizontal synchronizing signal, and as shown in FIG. 4, is constructed from two counting circuits 22 and 23 operated by output signal 109 of second frequency divider 11 and set/reset F/F 24. First counting circuit 22 is a counter that determines the cycle of the horizontal synchronizing signal that is reproduced, and second counting circuit 23 is a counter that determines the pulse width of horizontal synchronizing signal that is reproduced. The output of first counting circuit 22 is inputted to set terminal S of set/reset F/F 24, and the output 114 of second counting circuit 23 is inputted to reset terminal R of set/reset F/F 24. The output of this set/reset F/F 24 then becomes reproduced horizontal synchronizing signal 110 which is inputted to phase comparison inhibiting circuit 6, clamp signal generation circuit 13, vertical synchronizing signal reproduction circuit 14, and retiming circuit 15.

Figure 5:
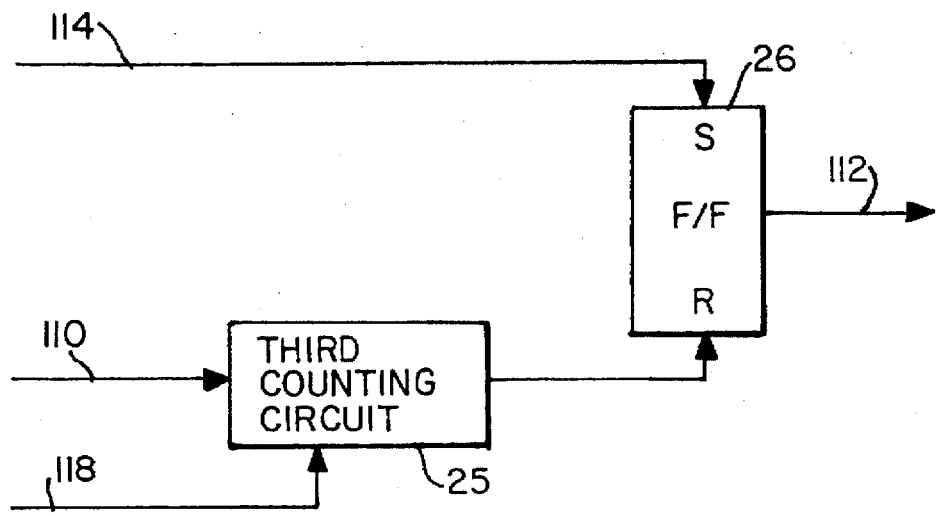
FIG. 5 is a circuit diagram of clamp signal generation circuit 13.

Clamp signal generation circuit 13 generates a clamp signal used for fixing to a particular voltage level the direct-current component of the back-porch portion of video signals 100. As shown in FIG. 5, the clamp circuit is constructed from third counting circuit 25 operated by reproduced horizontal synchronizing signal 110 for determining clamp width and set/reset F/F 26. The output 114 of second counting circuit 23 is inputted to set terminal S of set/reset F/F 26, and the output of third counting circuit 25 is inputted to reset terminal R of set/reset F/F 26. The output of this set/reset F/F 26 then becomes clamp signal 112 and is outputted to retiming circuit 15.

Figure 6:
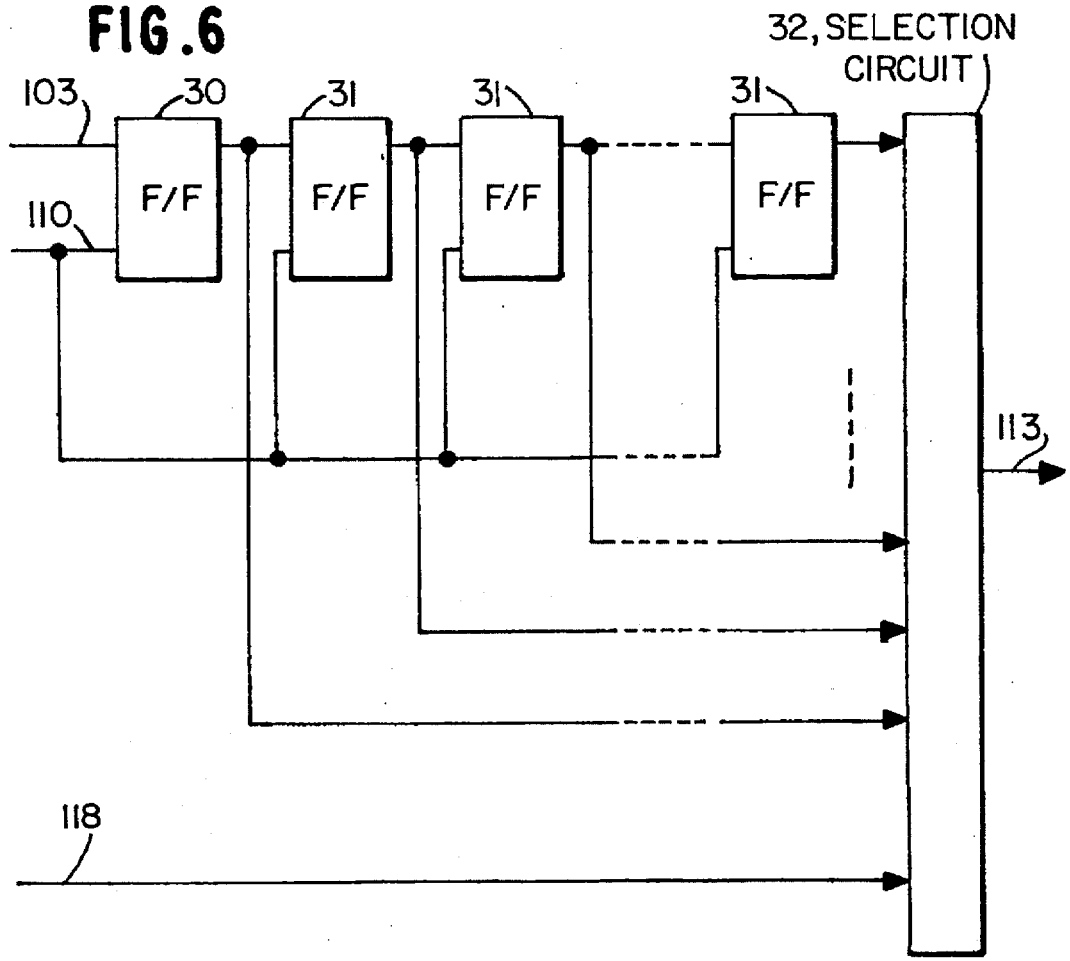
FIG. 6 is a circuit diagram of vertical synchronizing signal reproduction circuit 14.

Explanation will next be presented regarding vertical synchronizing signal reproduction circuit 14. As shown in FIG. 6, vertical synchronizing signal reproduction circuit 14 is constructed from F/F 30 which retimes vertical synchronizing signal 103 outputted from vertical synchronizing signal generation circuit 3 according to the rising (or falling) edge of reproduced horizontal synchronizing signal 110, a plurality of F/Fs 31 that perform multilevel delay of the output of F/F 30, and selection circuit 32 which selects one of the outputs of sections F/F 30 and F/F 31 and makes this output the reproduced vertical synchronizing signal 113.

Vertical synchronizing signal 103 is inputted on the data terminal of F/F 30 and reproduced horizontal synchronizing signal 110 is inputted to the clock terminal. Then, as shown in FIG. 10, the phase difference between two signals 103 and 110 equals to the steady-state phase error, and if there is no change in the amount of the steady-state phase error, the signal 103 can be retimed by signal 110, thus reproducing a stabilized reproduced vertical synchronizing signal 113. Multistage F/F 31 (shift register) are provided to enable flexible regulation of the phase relation of vertical synchronizing signal 103 to video signal 100 or reproduced horizontal synchronizing signal 110 from an upper level processor (not shown).

Further, reproduced vertical synchronizing signal 113 can be generated by retiming vertical synchronizing interval, which is superposed on horizontal synchronizing signal 102, in place of vertical synchronizing signal 103 inputted to vertical synchronizing signal reproduction circuit 14.

Figure 7:
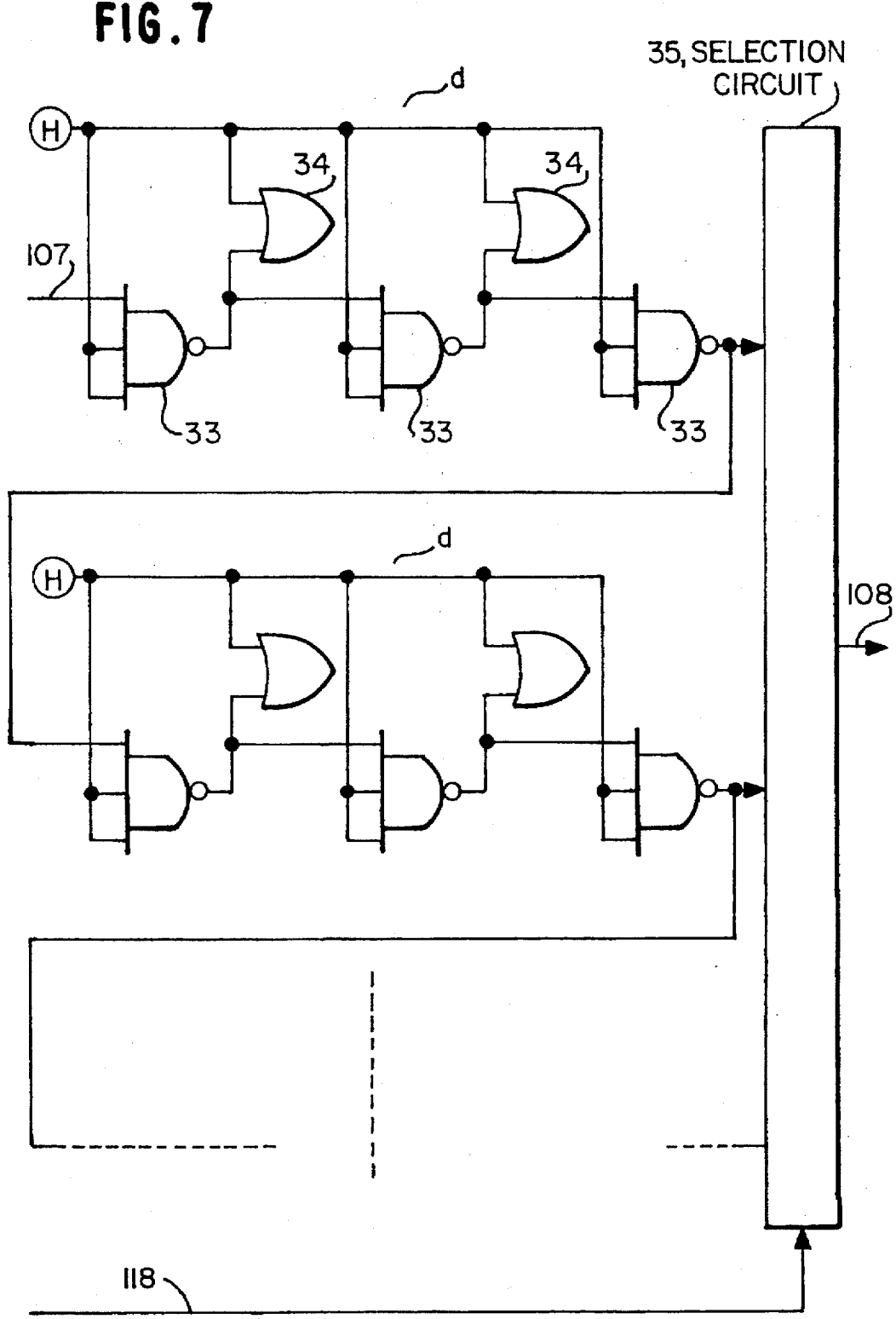
FIG. 7 is a circuit diagram of dot clock delay circuit 16.

As shown in FIG. 7, dot clock delay circuit 16 is constructed from basic delay elements d in units of several nanoseconds each composed of a plurality of logic elements 33 connected in series, the basic delay elements d being serially connected in n stages (n being a natural number), and delay taps from each stage being connected to selection circuit 35, dot clock delay circuit 16 thereby constituting a delay circuit having a maximum amount of delay (d×n). Dot clock delay circuit 16 is made up of logic elements of a gate array integrated circuit (LSI), and therefore, the total delay amount is on the order of several tens of nanoseconds, and the difference between the amount of delay for change from positive polarity to negative polarity by logic elements of the gate array LSI and the amount of delay for change from negative polarity to positive polarity is tied to degradation in duty (the ratio of positive to negative polarity). In addition, the amount of delay varies between logic elements according to load and connection length between logic elements. In particular, when delaying a high-speed dot clock signal, this variation in amount of delay results in degradation in clock duty and cannot be ignored when attempting regulation of the timing of video signals 100.

In the present embodiment, dummy logic elements 34 are therefore provided between logic elements 33 to make load uniform and minimize variation in delay amount. In addition, logic elements 33 having multiple input terminals are employed, and the input terminal having the minimum delay difference between input and output is selected and employed. Furthermore, when a single input terminal is provided having less than appropriate delay, the single input terminal can be substituted.

To make the synchronizing signal generation circuit applicable to multisync in the present embodiment, a parameter setting circuit 17 is provided for handling control information to enable control from the above-described processor over the frequencies of first and second frequency dividers 10, 11, the count values of first to third counting circuits 22, 23, 25, the amount of delay of vertical synchronizing signal reproduction circuit 14, and the amount of delay of dot clock signal 108. The control information includes enable signal 115, data 116, and clock signal 117, and the control information is serially transmitted to parameter setting circuit 17. After converting this control information to parallel data, parameter setting circuit 17 sends the data as setting information 118 to first frequency divider 10, second frequency divider 11, horizontal synchronizing signal reproduction circuit 12, clamp signal generation circuit 13, vertical synchronizing signal reproduction circuit 14, and dot clock delay circuit 16.

Thus, in the present embodiment, a monostable multivibrator-type timing generation circuit 4 is provided which is triggered by the rising (or falling) edge of horizontal synchronizing signal 102, and the time constant of monostable multivibrator 21 is made broader than the clock width of horizontal synchronizing signal 102, and moreover, is set to a value containing the steady-state phase error portion, which is a characteristic of a PLL circuit. Furthermore, a vertical synchronizing interval, which is superposed on vertical synchronizing signal 102, is retimed at F/F circuit 5, which takes as a clock the output of timing generation circuit 4, and phase comparison of horizontal synchronizing signal 102 and reproduced horizontal synchronizing signal 110 is inhibited by comparison inhibiting signal 105. As a result, stabilized reproduced horizontal synchronizing signal 110, reproduced vertical synchronizing signal 113, and high-speed dot clock signal 107 can be obtained even when horizontal synchronizing signal 102 is not present in the vertical synchronizing interval or when horizontal synchronizing signal 102 is present but not in phase with horizontal synchronizing signal outside vertical synchronizing interval, thereby overcoming the problems encountered in the prior art.

Moreover, because the frequency (cycles) of reproduced horizontal synchronizing signal 110 is determined by multiplication of the frequency divided values of the plurality of frequency dividers 10 and 11, the width of frequency (cycles) of generated signals (dot clock signals, etc.) can be significantly broadened in comparison with the prior art.

In addition, variation in the amount of delay can be suppressed by employing multi-input terminals in each of the logic elements 33 making up the basic logic elements and selecting the input terminal having the least amount of delay, and by providing dummy logic elements 34 between logic elements to regulate load.

First frequency divider 10 and second frequency divider 11 are provided within the PLL circuit, and the dot clock frequency is generated by 1/M frequency dividing the output of VCO 9 at first frequency divider 10, and the frequency of horizontal synchronizing signals is generated from the product of the frequency-divided value (1/M) of first frequency divider 10 and the frequency-divided value (1/P) of second frequency divider 11. Finally, because the frequency-divided values of each of frequency dividers 10, 11 can be freely set at parameter setting circuit 17, multisync can be handled with precise resolution using only one VCO 9 and one low-pass filter 8.

The present embodiment as described hereinabove is constructed with first frequency divider 10 and second frequency divider 11 physically separated in order to allow application to multisync, but in cases not requiring precise frequency resolution of dot clock signal 107 and reproduced horizontal synchronizing signal 110, application to multisync can be achieved through setting information 118 from parameter setting circuit 17 and employing one frequency divider that integrates the functions of these frequency dividers 10, 11.

While preferred embodiments of the present invention have been described using specific terms, such description is for illustrative purposes only, and it is to be understood that changes and variations may be made without departing from the spirit or scope of the following claims.

What is claimed is:

1. A synchronizing signal generation circuit comprising:

circuit means that separates and extracts a horizontal synchronizing signal and a vertical synchronizing signal from a signal in which the horizontal synchronizing signal and the vertical synchronizing signal are combined;

PLL circuit means provided with a phase comparison circuit, a voltage-controlled oscillator that outputs signals of oscillation frequency that accords with an output of said phase comparison circuit, and a frequency divider that frequency divides an output of said voltage-controlled oscillator and generates clock signals, wherein an output of said frequency divider is directed to said phase comparison circuit as a signal to be compared;

pulse signal generation circuit means, receiving said horizontal synchronizing signal output from said circuit means, to generate pulse signals that are synchronized with said horizontal synchronizing signal and are of a time constant containing a steady-state phase error of said PLL circuit that occurs during phase comparison;

signal conversion circuit means, responsive to said pulse signals, for sampling said horizontal synchronization signal to generate a signal indicative of active interval and active intervals of said vertical synchronizing signal; and phase comparison inhibiting circuit means that directs an output of said signal conversion circuit means to said phase comparison circuit of said PLL circuit and inhibits phase comparison during the active interval of said vertical synchronizing signal.

2. A synchronizing signal generation circuit comprising:

circuit means that separates and extracts a horizontal synchronizing signal and a vertical synchronizing signal from a signal in which the horizontal synchronizing signal and the vertical synchronizing signal are combined;

PLL circuit means provided with a phase comparison circuit, a voltage-controlled oscillator that outputs signals of oscillation frequency that accords with an output of said phase comparison circuit, a first frequency divider that frequency divides an output of said voltage-controlled oscillator and generates clock signals, a second frequency divider that frequency divides an output of said first frequency divider, and a horizontal synchronizing signal reproduction circuit that generates a reproduced horizontal synchronizing signal from an output of said second frequency divider; wherein the reproduced horizontal synchronizing signal is directed to said phase comparison circuit as a signal to be compared;

pulse signal generation circuit means, receiving said horizontal synchronizing signal output from said circuit means, to generate pulse signals that are synchronized with said horizontal synchronizing signal and are of a time constant containing a steady-state phase error of said PLL circuit that occurs during phase comparison;

signal conversion circuit means, responsive to said pulse signals, for sampling said horizontal synchronization signal to generate a signal indicative of active interval and inactive intervals of said vertical synchronizing signal;

phase comparison inhibiting circuit means that directs an output of said signal conversion circuit means to said phase comparison circuit and inhibits phase comparison during the active interval of said vertical synchronizing signal;

vertical synchronizing signal reproduction circuit means that generates a reproduced vertical synchronizing signal from said vertical synchronizing signal of said circuit means and said reproduced horizontal synchronizing signal of said horizontal synchronizing signal reproduction circuit; and retiming circuit means that retimes said reproduced vertical synchronizing signal according to an output of said second frequency divider.

3. A synchronizing signal generation circuit according to claim 2 where said horizontal synchronizing signal reproduction circuit includes:

a first counting circuit that determines a cycle of said reproduced horizontal synchronizing signal based on the output of said second frequency divider;

a second counting circuit that determines a pulse width of said horizontal synchronizing signal based on the output of said second frequency divider; and a flip-flop circuit that receives an output of said first counting circuit at a set terminal of said flip-flop and receives an output of said second counting circuit at a reset terminal of said flip-flop.

4. A synchronizing signal generation circuit according to claim 3 further comprising a parameter setting circuit for setting a frequency-division number of said first frequency divider and second frequency divider, count values of said first counting circuit and second counting circuit, and an amount of delay of said vertical synchronizing signal.

5. A synchronizing signal generation circuit according to claim 2 wherein said vertical synchronizing signal reproduction circuit means comprises:

a plurality of cascade-connected synchronous flip-flops for converting said reproduced horizontal synchronizing signal into a clock signal, wherein said vertical synchronizing signal of said circuit means is input to a first stage synchronous flip-flop of said plurality of cascade-connected synchronous flip flops, and delay taps are extracted from outputs of each stage of said plurality of cascade-connected synchronous flip-flops to regulate an amount of delay of the vertical synchronizing signal.

6. A synchronizing signal generation circuit according to claim 2 further comprising a parameter setting circuit for setting a frequency-division number of said first frequency divider and second frequency divider, and an amount of delay for said vertical synchronizing signal reproduction circuit means.

7. A synchronizing signal generation circuit according to claim 6, further comprising:

a delay circuit comprising at least one basic delay element, said basic delay element including:

at least a first and a second stage logic element connected in series and a dummy logic element connected in parallel between the first stage logic element and the second stage logic element, wherein said at least one basic delay element is connected in n stages (where n is a natural number), and a delay tap is extracted from an output of each basic delay element;

and wherein the output of said first frequency divider of said PLL circuit means is input to the delay circuit and the amount of delay of the first frequency-divider output can be regulated in steps, and wherein said parameter setting circuit further sets a delay of said delay circuit.

8. A synchronizing signal generation circuit comprising:

circuit means that separates and extracts a horizontal synchronizing signal and a vertical synchronizing signal from a signal in which the horizontal synchronizing signal and the vertical synchronizing signal are combined;

PLL circuit means provided with a phase comparison circuit, a voltage-controlled oscillator that outputs signals of oscillation frequency that accords with an output of said phase comparison circuit, and a frequency divider that frequency divides an output of said voltage-controlled oscillator and generates clock signals, wherein an output of said frequency divider is directed to said phase comparison circuit as a signal to be compared;

pulse signal generation circuit means, receiving said horizontal synchronizing signal output from said circuit means, to generate pulse signals that are synchronized with said horizontal synchronizing signal and are of a time constant containing the steady-state phase error of said PLL circuit that occurs in phase comparison;

signal conversion circuit means, responsive to said pulse signals, for sampling said horizontal synchronization signal to generate a signal indicative of active interval and inactive intervals of said vertical synchronizing signal;

phase comparison inhibiting circuit means that directs an output of said signal conversion circuit means to said phase comparison circuit of said PLL circuit and inhibits phase comparison during the active interval of said vertical synchronizing signal;

delay circuit comprising at least one basic delay element, said basic delay element including:

at least a first and a second stage logic element connected in series and a dummy logic element connected in parallel between the first stage logic element and the second stage logic element, wherein said at least one basic delay element is connected in n stages (where n is a natural number), and a delay tap is extracted from an output of each basic delay element stage;

and wherein the output of said frequency divider of said PLL circuit means is input to the delay circuit and the amount of delay of the frequency-divider output can be regulated in steps.

* * * * *